(12) United States Patent
Usui et al.

(10) Patent No.: US 6,355,586 B1
(45) Date of Patent: Mar. 12, 2002

(54) LOW MELTING POINT GLASS AND GLASS CERAMIC COMPOSITION

(75) Inventors: Hiroshi Usui; Yasuko Dotani; Ryuichi Tanabe; Tsuneo Manabe, all of Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/494,434

(22) Filed: Jan. 31, 2000

(30) Foreign Application Priority Data

Feb. 25, 1999 (JP) .............................. 11-048798

(51) Int. Cl.$^7$ .............................. C03C 8/08; C03C 8/04
(52) U.S. Cl. .............................. 501/45; 501/15; 501/46; 501/47; 501/48
(58) Field of Search .............................. 501/15, 45, 46, 501/47, 48

(56) References Cited

U.S. PATENT DOCUMENTS

| | | |
|---|---|---|
| 4,940,677 A | 7/1990 | Beall et al. |
| 5,022,921 A * | 6/1991 | Aitken .................. 501/48 |
| 5,246,890 A * | 9/1993 | Aitken et al. .................. 501/15 |
| 5,516,733 A | 5/1996 | Morena |
| 5,714,840 A | 2/1998 | Tanabe et al. |

FOREIGN PATENT DOCUMENTS

EP 0 365 235 A2 4/1990

* cited by examiner

Primary Examiner—Karl Group
(74) Attorney, Agent, or Firm—Oblon, Spivak, McClelland, Maier & Neustadt, P.C.

(57) ABSTRACT

A low melting point glass consisting essentially of, as represented by mol % based on the following oxides:

| | Mol % |
|---|---|
| SnO | 2 to 37.5, |
| ZnO | 5 to 73, |
| $P_2O_5$ | 16 to 50, |
| $Li_2O$ | 0 to 9, |
| $Na_2O$ | 0 to 9, |
| $K_2O$ | 0 to 9, |
| $Al_2O_3$ | 0 to 20, |
| $B_2O_3$ | 0 to 30, |
| $SiO_2$ | 0 to 20, |
| MgO | 0 to 35, |
| CaO | 0 to 35, |
| SrO | 0 to 35, |
| BaO | 0 to 35, |
| $In_2O_3$ | 0 to 10, |
| $WO_3$ | 0 to 10, | wherein $SnO+ZnO+P_2O_5+B_2O_3$ is at least 76 mol %, $Li_2O+Na_2O+K_2O$ is from 0 to 9 mol %, $MgO+CaO+SrO+BaO$ is from 0 to 35 mol %, and the molar ratio of SnO to ZnO is less than 1.

24 Claims, No Drawings

LOW MELTING POINT GLASS AND GLASS CERAMIC COMPOSITION

BACKGROUND OF THE INVENTION

1. Field of the Invention

The present invention relates to a low melting point glass containing no lead. Further, it relates to a glass ceramic composition containing a powder of this low melting point glass, which is useful for sealing a cathode ray tube or a flat display panel such as a plasma display panel (PDP) or a vacuum fluorescent display (VFD), for covering a substrate, or for forming partition walls in PDP or VFD.

2. Discussion of Background

Heretofore, a $PbO-B_2O_3-ZnO-SiO_2$ type crystallizable low melting point glass as disclosed, for example, in JP-B-36-17821, has been used for sealing a panel and a funnel of a cathode ray tube. Such a crystallizable low melting glass is coated on a sealing portion and then maintained at a temperature of from 440 to 450° C. for from 30 to 40 minutes, whereby the panel and the funnel will be sealed. The panel and the funnel thus sealed are evacuated while being heated at a temperature of from 300 to 380° C. to attain a high degree of vacuum with a pressure of at most $10^{-6}$ Torr, and then sealed.

Further, heretofore, a low melting point glass has been used also for sealing a glass substrate in PDP or VFD, and it has been sealed at a temperature of from 440 to 500° C. In the case of VFD, the panel thus sealed is evacuated while being heated at a temperature of from 250 to 380° C. to attain a high degree of vacuum and then sealed. In the case of PDP, the panel is likewise evacuated while being heated at a temperature of from 250 to 380° C., and a discharge gas such as Ne, Ne—Xe or He—Xe is sealed in to a level of from 100 to 500 Torr, and then the panel is sealed.

Heretofore, a glass containing lead has been used as a low melting point glass for sealing. Recently, however, a glass containing no lead has been desired.

Further, the low melting point glass which has heretofore been used for sealing, does not match in the expansion coefficient with e.g. a panel or a funnel of a cathode ray tube, or with a glass substrate to be used for PDP or VFD, whereby it has been likely that the sealed glass tends to break. Further, it has happened that due to the heating at the time of evacuation, the low melting point glass at the sealing portion has tended to flow or foam, or the sealing portion has tended to break.

Further, a low melting point glass to be used for sealing, covering or forming partitions walls in PDP or VFD, is required not to contain an alkali metal oxide which is likely to lower the electrical insulating property, or even if it contains such an alkali metal oxide, the content is required to be small. As such a glass, an attention has been drawn to a tin zinc phosphate type glass.

However, a tin zinc phosphate type glass heretofore known, has had the following problems.

(1) Due to the heating at the time of evacuation, the low melting point glass at the sealing portion tends to flow or foam, or the sealing portion tends to break.

(2) The glass is likely to undergo crystallization during firing, and when firing and flowing are carried out twice or more, the glass tends to hardly flow in the second or subsequent firing. Further, the dimensional fluctuation increases with the progress of crystallization by repetition of firing.

SUMMARY OF THE INVENTION

It is an object of the present invention to provide a low melting point glass and a glass ceramic composition which solve the above problems.

The present invention provides a low melting point glass (a glass of first embodiment) consisting essentially of, as represented by mol % based on the following oxides:

| | Mol % |
|---|---|
| SnO | 2 to 37.5, |
| ZnO | 5 to 73, |
| $P_2O_5$ | 16 to 50, |
| $Li_2O$ | 0 to 9, |
| $Na_2O$ | 0 to 9, |
| $K_2O$ | 0 to 9, |
| $Al_2O_3$ | 0 to 20, |
| $B_2O_3$ | 0 to 30, |
| $SiO_2$ | 0 to 20, |
| MgO | 0 to 35, |
| CaO | 0 to 35, |
| SrO | 0 to 35, |
| BaO | 0 to 35, |
| $In_2O_3$ | 0 to 10, |
| $WO_3$ | 0 to 10, | wherein $SnO+ZnO+P_2O_5+B_2O_3$ is at least 76 mol %, $Li_2O+Na_2O+K_2O$ is from 0 to 9 mol %, $MgO+CaO+SrO+BaO$ is from 0 to 35 mol %, and the molar ratio of SnO to ZnO is less than 1.

Further, the present invention provides a low melting point glass (a glass of second embodiment) consisting essentially of, as represented by mol % based on the following oxides.

| | Mol % |
|---|---|
| SnO | 2 to 37.5, |
| ZnO | 32 to 73, |
| $P_2O_5$ | 25 to 50, |
| $Li_2O$ | 0 to 9, |
| $Na_2O$ | 0 to 9, |
| $K_2O$ | 0 to 9, |
| $Al_2O_3$ | 0 to 20, |
| $B_2O_3$ | 0 to 30, |
| $SiO_2$ | 0 to 20, |
| MgO | 0 to 30, |
| CaO | 0 to 30, |
| SrO | 0 to 30, |
| BaO | 0 to 30, | wherein $Li_2O+Na_2O+K_2O$ is from 0 to 9 mol %, $MgO+CaO+SrO+BaO$ is from 0 to 30 mol %, and the molar ratio of SnO to ZnO is less than 1.

Still further, the present invention provides a low melting point glass (a glass of third embodiment) consisting essentially of, as represented by mol % based on the following oxides:

| | Mol % |
|---|---|
| SnO | 2 to 35, |
| ZnO | 5 to 45, |
| $P_2O_5$ | 16 to 50, |
| $Li_2O$ | 0 to 3, |
| $Na_2O$ | 0 to 3, |
| $K_2O$ | 0 to 3, |
| $Al_2O_3$ | 0 to 10, |
| $B_2O_3$ | 0.1 to 30, |
| MgO | 0 to 35, |
| CaO | 0 to 35, |
| SrO | 0 to 35, |
| BaO | 0 to 35, |
| $In_2O_3$ | 0 to 10, |
| $WO_3$ | 0 to 10, | wherein $Li_2O+Na_2O+K_2O$ is from 0 to 3 mol %, $MgO+CaO+SrO+BaO$ is from 0 to 35 mol %, $Al_2O_3+In_2O_3+WO_3$ is from 0 to 3 mol % and the molar ratio of SnO to ZnO is less than 1. The glass of third embodiment is effective particularly for solving the above-mentioned problem (2).

Further, the present invention provides a glass ceramic composition containing a powder of the low melting point glass of first, second or third embodiment.

DETAILED DESCRIPTION OF THE PREFERRED EMBODIMENTS

The low melting point glass of the present invention (hereinafter referred to simply as the glass of the present invention) has a softening point $T_s$ of at most 600° C. If the softening point exceeds 600° C., it tends to be difficult to employ such a glass for sealing, covering or formation of partition walls for e.g. PDP or VFD. The softening point is preferably at most 580° C., more preferably at most 560° C., most preferably at most 550° C.

Further, when the glass is used for covering or formation of partition walls for e.g. PDP or VFD, $T_s$ is preferably at least 500° C. If it is less than 500° C., the covering or the formation of partition walls tends to be difficult. It is more preferably at least 510° C., particularly preferably at least 520° C., most preferably at least 530° C.

When the glass of the present invention is used for sealing, covering or formation of partition walls, it is usually pulverized for use. Such pulverized glass is mixed with a low expansion ceramic filler, a heat resistant pigment, etc., as the case requires, and then kneaded with a vehicle to obtain a paste. This glass paste is coated at a predetermined portion of a substrate glass and fired. Here, the substrate glass includes one having a transparent conductive film or the like coated on glass.

The crystallization temperature ($T_c$) of the glass of the present invention is preferably higher by at least 40° C. than $T_s$. if the difference between $T_c$ and $T_s$, i.e. ($T_c$-$T_s$), is less than 50° C., the glass tends to be crystallizable during firing. Here, $T_c$ is the crystallization peak temperature obtainable by a differential thermal analysis, and when the crystallization peak is not observed, $T_c=\infty$. ($T_c$-$T_s$) is more preferably at least 60° C., particularly preferably at least 70° C. most preferably at least 80° C.

When the glass of the present invention is used for sealing for e.g. a cathode ray tube, PDP or VFD, the average linear expansion coefficient in a range of from 50 to 300° C. is preferably at most 120×10$^{-7}$/° C. Hereinafter, the average linear expansion coefficient in a range of from 50 to 300° C. is represented by $\alpha_{300}$.

When the glass of the present invention is used for covering or formation of partition walls for PDP or VFD, the average linear expansion coefficient in a range of from 50 to 250° C. is preferably at most 120×10$^{-7}$/° C. If it exceeds 120×10$^{-7}$/° C., matching of the expansion coefficient to the substrate glass tends to be difficult. The average linear expansion coefficient is more preferably at most 110×10$^{-7}$/° C., particularly preferably at most 100×10$^{-7}$/° C. Further, the above linear expansion coefficient is preferably at least 60×10$^{-7}$/° C. Hereinafter, the average linear expansion coefficient in a range of from 50 to 250° C., is represented by $\alpha_{250}$.

Now, the composition of the glass of the present invention will be described below, wherein mol % will be referred to simply as %.

SnO is a component which lowers the softening point to increase the fluidity, and is thus essential. If it is less than 2%, the softening point tends to be too high, whereby the fluidity tends to decrease, and for example, the strength and air tightness of the sealing portion will be impaired, and sealing may not be accomplished at a temperature of from 400 to 600° C. It is preferably at least 3%, more preferably at least 7%, still more preferably at least 10%, particularly preferably at least 15%. If it exceeds 37.5%, the meltability of the glass tends to be low, and a coating film-like foreign matter layer is likely to be formed on the surface of molten glass, whereby it tends to be difficult to obtain a homogeneous glass. Preferably, it is at most 35%, more preferably at most 30%, particularly preferably at most 25%.

ZnO is essential and effective for stabilizing the glass, or improving the chemical durability, particularly the water resistance, lowering the expansion coefficient or lowering the softening point. If it is less than 5%, the above effects will be small. It is preferably at least 20%, more preferably at least 24%, particularly preferably at least 25%, most preferably at least 32%. If it exceeds 73%, the softening point tends to be too high, the glass tends to undergo devitrification, or it tends to crystallize during firing. It is preferably at most 71%, more preferably at most 45%, particularly preferably at most 35%, most preferably less than 32%.

When $B_2O_3$ is contained, the content of ZnO is preferably from 5 to 45%.

The molar ratio of SnO to ZnO, i.e. the value obtained by dividing the content of SnO by the content of ZnO, must be less than 1. If this molar ratio is 1 or higher, the meltability of the glass deteriorates, and a film-like foreign layer is likely to be formed on the molten glass surface. The molar ratio is preferably at most 0.97, more preferably at most 0.93, particularly preferably at least 0.90, most preferably at most 0.8.

$P_2O_5$ is a network former and essential. If it is less than 16%, vitrification tends to be difficult. It is preferably at least 25%, more preferably at least 27%, particularly preferably at least 28%. If it exceeds 50%, the chemical durability, particularly the water resistance, tends to deteriorate. It is preferably at most 40%, more preferably at most 37%.

$B_2O_3$ is effective for stabilizing the glass, increasing the fluidity, lowering the expansion coefficient or the like. In the glass of first embodiment and the glass of second embodiment, $B_2O_3$ is not essential, but in the glass of third embodiment, $B_2O_3$ is essential. If the content of $B_2O_3$ exceeds 30%, the softening point tends to be too high, whereby the fluidity deteriorates, and, for example, the strength and air tightness of the sealing portion tend to be impaired, the chemical durability deteriorates, or the glass tends to be unstable. It is preferably at most 20%, more preferably at most 15%, particularly preferably at most 10%, most preferably at most 5%. When $B_2O_3$ is contained, its content is preferably at least 0.1%. If it is less than 0.1%, the above-mentioned effects tend to be too small. It is more preferably at least 0.5%, particularly preferably at least 1%. The total of contents of SnO, ZnO, $P_2O_5$ and $B_2O_3$ is preferably at least 76%. If the total is less than 76%, vitrification tends to be difficult.

Each of $Li_2O$, $Na_2O$ and $K_2O$ is not essential, but may be contained up to 9% each, in order to increase the fluidity by lowering the softening point. If the content exceeds 9%, the electrical insulating property tends to deteriorate, the chemical durability tends to deteriorate or the expansion coefficient tends to be too large. Each content is more preferably at most 3%, particularly preferably at most 1%, most preferably at most 0.5%. When the electrical insulating property is of importance, it is preferred that none of $Li_2O$, $Na_2O$ and $K_2O$ is contained substantially i.e. their contents are not higher than impurity levels.

The total of contents of $Li_2O$, $Na_2O$ and $K_2O$ is at most 9%. If the total content exceeds 9%, the electrical insulating property tends to deteriorate, the chemical durability tends to deteriorate or the expansion coefficient tends to be too large. The total content is more preferably at most 3%, particularly preferably at most 1%, most preferably at most 0.5%.

$Al_2O_3$ is not essential, but may be contained up to 20%, as it is effective for lowering the expansion coefficient, increasing the chemical durability or suppressing crystallization during firing. If it exceeds 20%, the softening point tends to be too high, whereby the fluidity deteriorates, and for example, the strength and air tightness of the sealing portion tend to be impaired. It is more preferably at most 10%, particularly preferably at most 5%, most preferably at most 4%. When $Al_2O_3$ is contained, its content is preferably at least 0.1%.

$SiO_2$ is not essential, but may be contained up to 20% in order to lower the expansion coefficient. If it exceeds 20%, the softening point tends to be too high, whereby the fluidity deteriorates, and for example, the strength and air tightness of the sealing portion tend to be impaired. It is more preferably at most 10%, particularly preferably at most 5%. In order to lower the softening point, it is preferred not to substantially contain $SiO_2$. If $SiO_2$ is contained, its content is preferably at least 0.1%.

Each of MgO, CaO, SrO and BaO is not essential, but may be contained up to 35% each, in order to stabilize the glass or to suppress crystallization during firing. If the content exceeds 35%, the softening point tends to be too high. It is more preferable at most 30%, particularly preferably at most 19%, most preferably at most 15%.

When at least one member among MgO, CaO, SrO and BaO, is contained, the total content is preferably at most 35%. If the total content exceeds 35%, the softening point tends to be too high. It is preferably at most 30%, more preferably at most 20%, particularly preferably at most 19%, most preferably at most 15%. In a case where it is desired to suppress the crystallization during firing or stabilize the glass, the above-mentioned total content is preferably at least 2%, more preferably at least 2.5%, particularly preferably at least 4%, most preferably at least 8%.

Each of $In_2O_3$ and $WO_3$ is not essential, but may be contained up to 10% each, in order to increase the chemical durability or to suppress crystallization during firing. If the content exceeds 10%, the softening point tends to be too high. It is more preferably at most 5%, particularly preferably at most 4%.

When at least one member among $Al_2O_3$, $In_2O_3$ and $WO_3$, is contained, the total content is preferably at most 10%. If the total content exceeds 10%, the softening point tends to be too high. The total content is more preferably at most 7%, particularly preferably at most 5%. On the other hand, the total content is preferably at least 0.5%.

The glass of the present invention consists essentially of the above-mentioned components, but may contain other components in a total of up to 5 mol %. As such other components, rare earth oxides such as $La_2O_3$ and $CeO_2$, $TiO_2$, $V_2O_5$, MnO, $Fe_2O_3$, CoO, NiO, CuO, $Y_2O_3$, $ZrO_2$, $MoO_3$, $Rh_2O_3$, PdO, $Ag_2O$, $TeO_2$, and $Bi_2O_3$, may, for example, be mentioned. Each of PbO and CdO is not substantially contained, i.e. is not higher than the impurity levels.

Further, it is preferred that a halogen element such as F or Cl is not substantially contained. The halogen atom is likely to gasify during firing and react with a phosphor in PDP, VFD or the like to deteriorate the phosphor or to deposit on a filament of VFD to deteriorate the emission.

Now, a glass ceramic composition and a conductive paste employing the glass of the present invention, will be described. The glass ceramic composition of the present invention contains a powder of the glass of the present invention as an essential component and may further contain a low expansion ceramic filler or the like. Here, the low expansion ceramic filler is a ceramic powder having $\alpha_{300}$ of at most $70 \times 10^{-7}/°$ C.

When the glass of the present invention is used for sealing a panel and a funnel of a cathode ray tube (hereinafter referred to simply as sealing of a cathode ray tube), the content of the powder of this glass is preferably from 60 to 100 wt %. The low expansion ceramic filler has an effect to reduce the expansion coefficient, whereby matching of the thermal expansion coefficient to the panel and the funnel will be facilitated. If the above-mentioned content of the glass powder is less than 60 wt %, the fluidity tends to be too low, whereby the air tightness of the sealing portion tends to be impaired. It is more preferably from 65 to 99 wt %, particularly preferably from 70 to 99 wt %.

On the other hand, the low expansion ceramic filler is preferably contained within a range of from 0 to 40 wt %, although it is not essential. If the total content of the low expansion ceramic filler exceeds 40 wt %, the fluidity at the time of sealing tends to be low. The total content is more preferably from 1 to 35 wt %, particularly preferably from 1 to 30 wt %.

As such a low expansion ceramic filler, a powder of alumina, mullite, zircon, cordierite, aluminum titanate, β-spodumene, silica, β-quartz solid solution or β-eucryptite is easy to handle and preferred. These fillers may be used alone or in combination as a mixture of two or more of them.

Among low expansion ceramic fillers, the total content of alumina, mullite and zircon is preferably at most 9 wt %. The average linear expansion coefficient in a range of from 50 to 350° C. is from $65 \times 10^{-7}$ to $75 \times 10^{-7}/°$ C. with alumina, from $50 \times 10^{-7}$ to $60 \times 10^{-7}/°$ C. with mullite, and from $42 \times 10^{-7}$ to $48 \times 10^{-7}/°$ C. with zircon. Thus, the expansion coefficients are relatively large, and even if they are mixed with the powder of the glass of the present invention, the effects to adjust the expansion coefficient are smaller than other low expansion ceramic fillers. By controlling the content of the low expansion ceramic filler within the above-mentioned preferred range, the desired expansion coefficient can be obtained without substantially reducing the amount of the glass powder, whereby it is possible to improve the strength of the sealing portion. In such a case, at least one member among alumina, mullite and zircon may be contained, or none of them may be contained.

For reference, average linear expansion coefficients (unit: $\times 10^{-7}/°$ C.) in a range of from 50 to 350° C. of other low expansion ceramic fillers will be shown below.

| | |
|---|---|
| Cordierite | 10 to 20 |
| Aluminum titanate | 10 to 20 |
| β-Spodumene | 8 to 15 |
| Silica | 5 to 6 |
| β-Quartz solid solution | −10 to +10 |
| β-Eucryptite | −60 to −80 |

It is preferred that $\alpha_{300}$ of a fired body obtainable by firing a glass ceramic composition to be used for sealing a cathode ray tube is from $80 \times 10^{-7}$ to $110 \times 10^{-7}/°$ C. If $\alpha_{300}$ is outside this range, a tensile stress will be exerted to the panel glass, the funnel glass or the sealing portion, whereby the pressure resistance of a valve having the panel glass and the funnel glass sealed, will deteriorate.

Further, when the glass of the present invention is used for sealing PDP or VFD, the content of a powder of the above glass is preferably from 50 to 100 wt %. If a low expansion ceramic filler is incorporated, it provides an effect to reduce the expansion coefficient, whereby matching of the expansion coefficient to the substrate of PDP or VFD will be facilitated. If the content of the glass powder is less than 50 wt %, the fluidity tends to be poor, and the air tightness of the sealing portion tends to be impaired. The content is more preferably from 55 to 99 wt %, particularly preferably from 60 to 98 wt %.

On the other hand, in such a case, the low expansion ceramic filler is not essential, but is preferably contained in an amount of from 0 to 50 wt %, more preferably from 1 to 45 wt %, particularly preferably from 2 to 40 wt %.

As such a low expansion ceramic filler, like in the case of the sealing composition for a cathode ray tube, a powder of alumina, mullite, zircon, cordierite, aluminum titanate, β-spodumene, silica, β-quartz solid solution or β-eucryptite, is preferred from the viewpoint of handling efficiency. These fillers may be used alone or in combination as a mixture of two or more of them.

Further, among the low expansion ceramic fillers, the total content of alumina, mullite and zircon is preferably at most 9 wt %. In such a case, at least one member among alumina, mullite and zircon may be contained, or none of them may be contained. As mentioned above, alumina, mullite and zircon have relatively large expansion coefficients, and even if they are mixed with the powder of the glass of the present invention, the effect to adjust the expansion coefficient is smaller than other low expansion ceramic fillers. By adjusting the content of the low expansion ceramic filler within the above preferred range, it is possible to obtain the desired expansion coefficient without substantially reducing the amount of the glass powder, and such will be effective for improving the strength of the sealing portion.

It is preferred that $\alpha_{250}$ of a fired body obtainable by firing a glass ceramic composition to be used for sealing PDP or VFD, is from $60 \times 10^{-7}$ to $90 \times 10^{-7}/°$ C. If $\alpha_{250}$ is outside this range, a tensile stress will be exerted intensively to the substrate glass or the fired body, whereby the strength of the sealing portion is likely to deteriorate.

A heat resistant pigment may be incorporated as a coloring agent to a glass ceramic composition to be used for sealing PDP or VFD, in order to improve the appearance of the display.

Further, when the glass of the present invention is used for coating a substrate, it is preferred that the content of the powder of this glass is adjusted to be from 50 to 100 wt %, and the content of a low expansion ceramic filler is adjusted to be from 0 to 50 wt %, although such a low expansion ceramic filler is not essential. The substrate can be covered by coating such a glass ceramic composition for coating, on the substrate, followed by heating at a temperature of from 400 to 700° C. for from 5 minutes to 1 hour. Here, the material for the substrate may, for example, be a heat resistant material such as glass or ceramics. Further, as the low expansion ceramic filler, the one which is the same as for the above-mentioned ceramic composition for sealing, may be employed.

Still further, when the glass of the present invention is used for forming partition walls of PDP or VFD, it is preferred that the content of the powder of this glass is adjusted to be from 50 to 100 wt %, and the content of a low expansion ceramic filler is adjusted to be from 0 to 50 wt %, although such a low expansion ceramic filler is not essential. In addition, a heat resistant pigment such as a white pigment (such as $TiO_2$) or a black pigment (such as a Fe-Mn type pigment, a Fe—Co—Cr type pigment or a Fe—Mn—Al type pigment) may be incorporated, as the case requires. Further, as the low expansion ceramic filler, the one which is the same as for the above-mentioned ceramic composition for sealing, may be employed.

The glass ceramic composition of the present invention is usually kneaded with a resin component such as ethyl cellulose, nitro cellulose, an acrylic resin, a poly α-methylstyrene resin or a butyral resin, or with an organic vehicle containing a suitable solvent such as α-terpineol, isoamyl acetate, 2,2,4-trimethyl-1,3-pentanediol monoisobutyrate, phenoxyethanol, ethyl cellosolve, dibutyl cellosolve, dibutyl carbitol, butyl carbitol acetate, or ethylene glycol monophenyl ether, to form a paste for use.

Further, a powder of the glass of the present invention can be used also as a binder for e.g. a conductive paste, a resistive paste or a dielectric paste. For example, when it is used as a binder for a conductive paste, it is preferred to form it into a glass ceramic composition comprising from 1 to 50 wt % of a powder of the glass of the present invention, from 50 to 90 wt % of a conductive powder, and as an optional component, from 0 to 10 wt % of a low expansion ceramic filler powder.

To use such a composition as a conductive paste, an organic vehicle is optionally added to form a paste. Here, as the conductive powder, a powder having electrical conductivity, such as Ag, Pd, Al, Ni, Cu, Au or a mixture thereof, may, for example, be mentioned. By heating and firing such a conductive paste at a temperature of from 400 to 900° C. for from 5 minutes to 1 hour, a conductive body can be formed.

Now, the present invention will be described in further detail with reference to Examples. However, it should be understood that the present invention is by no means restricted to such specific Examples.

Glass powders having compositions shown in Tables 1 to 3, as represented by mol % in lines for from SnO to SnO/ZnO, were prepared as follows.

85% orthophosphoric acid was dropwise added to solid starting materials other than $P_2O_5$, to obtain a starting material slurry, which was thoroughly mixed and then dried at 120° C. to obtain a powder batch. This powder batch was put into a quartz crucible and after covered with a lid, melted (typically melted for 30 minutes) at a temperature of from 900 to 1,200° C. (typically at 1,100° C.) and then formed into a flake-shaped glass by water granulation or by passing through stainless steel rollers. Then, the flake-shaped glass was pulverized in an alumina ball mill for a predetermined period of time (typically for 105 minutes) to prepare a glass powder.

With respect to some glasses in Tables 1 to 3, the softening point $T_s$ and the expansion coefficient $\alpha_G$ were measured, and the results are shown in the Tables.

$T_s$ (unit: ° C.): Using a glass powder having an average particle size of from 10 to 20 μm, $T_s$ was measured by raising the temperature from room temperature to 800° C. at a temperature raising rate of 10° C./min by a differential thermal analysis. Here, an alumina powder was used as a standard substance.

$\alpha_G$ (unit: $\times 10^{-7}/°$ C.): The above-mentioned molten glass was cast on a stainless steel plate and slowly cooled in the vicinity of the glass transition point. The cooled glass was formed into a rod having a diameter of 2 mm and a length of 20 mm, which was used as a sample, and using quartz glass as a standard sample, the elongation was measured under a condition of a temperature raising rate of 10° C./min by a differential thermal expansion meter. With respect to glasses for a cathode ray tube in Tables 1 and 2, the average linear expansion coefficients were calculated in a range of from 50 to 300° C., and with respect to the glasses for other applications in Tables 1 and 2 and the glasses in Table 3, the average linear expansion coefficients were calculated in a range of from 50 to 250° C., and they were taken as $\alpha_G$, respectively.

The glass powder and the low expansion ceramic filler in Table 1 were mixed in a ratio as represented by wt % in the lines for "Glass" and "Filler" in "Construction" in Table 1, to prepare a glass ceramic composition. Here, Examples 1 to 8 represent Working Examples of the present invention, and Examples 9 and 10 represent Comparative Examples. The glass of Example 11 is a glass of the present invention, but the glass ceramic composition of Example 11 is outside the scope of the present invention. With respect to this glass ceramic composition, the flow button diameter, the residual strain and the expansion coefficient were measured, and the results are shown in Table 1.

Flow button diameter (unit: mm): The flow button diameter indicates the fluidity of the glass ceramic composition during sealing. Firstly, a sample powder of the glass ceramic composition is prepared in an amount of 5.5 g with respect to one for a cathode ray tube or 3.5 g with respect to one for PDP or VFD. Then, this sample powder is press-molded into a cylindrical shape having a diameter of 12.7 mm and then held at a firing temperature (unit: ° C.) as identified in Table 1 for 30 minutes for firing. The diameter of the fired body obtainable by the firing is taken as the flow button diameter. This flow button diameter is desired to be at least 26.5 mm with respect to a glass ceramic composition for sealing a cathode ray tube, or at least 20.0 mm with respect to a glass ceramic composition for sealing PDP or VFD.

Residual strain (unit: nm/cm): A glass ceramic composition and an organic vehicle (a solution having 1.2% of nitrocellulose dissolved in isoamyl acetate) are mixed in a weight ratio of 6.5:1 to obtain a glass paste. In the case for a cathode ray tube, this glass paste is coated on a funnel glass specimen, and in the case for sealing PDP or VFD, this glass paste is coated on a substrate glass specimen, followed by firing under the same condition as in the case for the flow button diameter. The residual strain (unit: nm/cm) formed between the funnel glass specimen or the substrate glass specimen, is measured by a polarimeter. The symbol "+" in the Table represents a case where the above fired body receives a compression strain, and the symbol "−" represents a case where the fired body receives a tensile strain. This residual strain is desired to be within a range of from −100 to +500 nm/cm.

Expansion coefficient (unit: $\times 10^{-7}/°$ C.) : A glass ceramic composition is fired under the same condition as in the case for the flow button diameter and then polished into a desired size, whereupon the elongation is measured under a condition of a temperature raising rate of 10° C./min by a differential thermal expansion meter. With respect to one for sealing a cathode ray tube, the average linear expansion coefficient is calculated in a range of from 50 to 300° C., and with respect to one for sealing PDP or VFD, the average linear expansion coefficient is calculated in a range of from 50 to 250° C. (for PDP). Taking into consideration the matching to the expansion coefficient of the object to be sealed, the average linear expansion coefficient is desired to be from $80 \times 10^{-7}$ to $110 \times 10^{-7}/°$ C. with respect to one for a cathode ray tube, or from $60 \times 10^{-7}$ to $90 \times 10^{-7}/°$ C. with respect to one for sealing PDP or VFD.

One of the glass ceramic compositions of Examples 1 to 5 and 9 was placed between a funnel and a panel for 25 model and held at a temperature of from 400 to 500° C. for 30 minutes to seal the funnel and the panel thereby to obtain a bulb. On the other hand, one of the glass ceramic compositions of Examples 6, 7 and 10 was coated along edges of PDP substrates having electrodes and partition walls preliminarily formed, and held at a temperature of from 400 to 600° C. for 30 minutes for sealing to obtain PDP. Further, a grid was placed between the edges of glass substrates having electrodes, etc. formed, and one of the glass ceramic compositions of Examples 8 and 11 was placed along the edges and held at a temperature of from 400 to 600° C. for 30 minutes to seal the glass substrates to each other to obtain VFD. With respect to such bulb, PDP and VFD, the strength under water pressure and the strength in high temperature were measured as follows. The results are shown in Table 1.

Strength under water pressure (unit: kgf/cm$^2$): A pressure difference is exerted by water between the interior and the exterior of the bulb, PDP or VFD, and the pressure difference at breakage is measured. Such measurement is repeated five times, and the average value is taken as the strength under water pressure. To guarantee the strength of the bulb, PDP or VFD, this strength under water pressure is desired to be at least 3 kgf/cm$^2$.

Strength in high temperature (unit: ° C.): A temperature difference is exerted by water and hot water between the interior and the exterior of the bulb, PDP or VFD, and the temperature difference at breakage is measured. The measurement is repeated five times, and the average value is taken as the strength in high temperature. In view of the thermal stress formed in the heat treatment step in the production of a cathode ray tube, PDP or VFD, this strength in high temperature is desired to be at least 45° C.

The glass ceramic compositions of Examples 1 and 2 contain neither zircon nor alumina having a relatively large expansion coefficient, whereby the strength under water pressure is higher than the glass ceramic composition of Example 4. For the same reason, the glass ceramic composition of Example 6, has a strength under water pressure which is higher than the glass ceramic composition of Example 7.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- | --- | --- |
| Application | Cathode ray tube | | | | | PDP | | VFD | CRT* | PDP | VFD |
| SnO | 27 | 59 | 5 | 20 | 32 | 31 | 17 | 28 | 44 | 0 | 12 |
| ZnO | 40 | 33 | 64 | 52 | 33 | 41 | 50 | 39 | 36 | 72 | 53 |
| P$_2$O$_5$ | 33 | 30 | 31 | 28 | 35 | 28 | 33 | 33 | 20 | 28 | 35 |
| Li$_2$O | 0 | 3 | 0 | 0 | 0 | 0 | 0 | 0 | 0 | 0 | 0 |

TABLE 1-continued

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| $Na_2O$ | 0 | 3 | 0 | 0 | 0 | 0 | 0 | 0 | 0 | 0 | 0 |
| $K_2O$ | 0 | 2 | 0 | 0 | 0 | 0 | 0 | 0 | 0 | 0 | 0 |
| SnO/ZnO | 0.68 | 0.88 | 0.08 | 0.39 | 0.97 | 0.76 | 0.34 | 0.72 | 1.22 | 0 | 0.23 |
| Construction |  |  |  |  |  |  |  |  |  |  |  |
| Glass | 93 | 92 | 100 | 80 | 89 | 78 | 71 | 75 | 79 | 76 | 46 |
| Filler |  |  |  |  |  |  |  |  |  |  |  |
| Alumina | 0 | 0 | 0 | 1 | 0 | 0 | 0 | 6 | 5 | 0 | 0 |
| Mullite | 0 | 0 | 0 | 0 | 5 | 0 | 2 | 0 | 0 | 0 | 0 |
| Zircon | 0 | 0 | 0 | 15 | 1 | 0 | 20 | 3 | 16 | 9 | 0 |
| Cordierite | 6 | 0 | 0 | 0 | 5 | 20 | 0 | 16 | 0 | 0 | 0 |
| Aluminum titanate | 0 | 3 | 0 | 0 | 0 | 0 | 3 | 0 | 0 | 0 | 0 |
| β-Spodumene | 0 | 0 | 0 | 1 | 0 | 0 | 0 | 0 | 0 | 5 | 0 |
| Silica | 1 | 3 | 0 | 0 | 0 | 2 | 4 | 0 | 0 | 0 | 0 |
| β-Quartz solid solution | 0 | 0 | 0 | 1 | 0 | 0 | 0 | 0 | 0 | 5 | 6 |
| β-Eucryptite | 0 | 2 | 0 | 2 | 0 | 0 | 0 | 0 | 0 | 5 | 48 |
| Firing temperature | 440 | 450 | 450 | 460 | 450 | 490 | 460 | 480 | 440 | 450 | 460 |
| Flow button diameter | 27.0 | 26.8 | 27.1 | 27.0 | 27.2 | 20.6 | 20.2 | 21.0 | 20.1 | 15.6 | 16.0 |
| Residual strain | +90 | +50 | +95 | +31 | +16 | +98 | +30 | +50 | −26 | −15 | +210 |
| Expansion coefficient | 85 | 90 | 82 | 92 | 96 | 70 | 72 | 71 | 98 | 80 | 71 |
| Strength under water pressure | 4.0 | 3.8 | 3.9 | 3.5 | 3.3 | 3.8 | 3.5 | 3.6 | 1.6 | 2.6 | 1.6 |
| Strength in high temperature | 49 | 48 | 46 | 49 | 46 | 49 | 48 | 46 | 32 | 36 | 41 |
| $T_S$ | 433 | 440 | — | 451 | 427 | 435 | 453 | 437 | 415 | — | — |
| $α_G$ | 87 | 99 | 82 | — | — | 76 | 83 | 83 | — | — | — |

CRT*: Cathode ray tube

Examples 12 to 20 for glass ceramic compositions to be used for covering the substrate, as a binder for a conductive paste and for forming partition walls, are shown in the columns for "Covering", "Conductor" and "Partition wall" in Table 2. The compositions are shown as represented by wt % in "Construction" in Table 2. Example 21 is a Comparative Example.

The sintering degree and the expansion coefficient (the average linear expansion coefficient in a range of from 50 to 250° C.) in the case of firing at a firing temperature (unit: ° C.) as identified in the Table, are shown in Table 2. The evaluation of the sintering degree was carried out by observing the cross-section of the fired body obtained by firing, by means of an electron microscope under 1,000 magnifications, whereby one having a void proportion (a porous ratio) of less than 20%, was taken as having a good sintering degree, one having a void proportion of at least 20%, was taken as having a poor sintering degree.

The glass ceramic compositions of Examples 12 and 13 for covering, were kneaded with an organic vehicle having ethyl cellulose dissolved in α-terpineol to form pastes. Such glass plates were screen-printed on glass substrates, dried and then fired at a firing temperature as identified in Table 2 to cover the glass substrates.

The glass ceramic compositions of Examples 14 and 15 for conductive pastes, contain a conductive powder such as Ag or Al in a proportion represented by wt % in Table 2. These glass ceramic compositions were kneaded with an organic vehicle having ethyl cellulose dissolved in α-terpineol to form pastes. The obtained glass pastes were screen-printed in a predetermined pattern on glass plates, dried and then fired at a firing temperature as identified in Table 2, to form conductive patterns on the glass plates.

The glass ceramic compositions of Examples 16 to 20 for forming partition walls of PDP or VFD, were kneaded with an organic vehicle having ethyl cellulose dissolved in α-terpineol to form pastes. The obtained glass plates were screen-printed and dried, and then patterning was carried out by sand blasting. Otherwise, a photosensitive resin was mixed into the glass pastes, followed by screen printing, drying, exposing and etching for patterning. After forming a pattern, firing was carried out at a firing temperature as identified in Table 2 to form predetermined partition walls on the glass substrate.

TABLE 2

|  | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|
| Application | Covering | | Conductor | | Partition wall | | | | | CE* |
| SnO | 20 | 31 | 33 | 10 | 20 | 25 | 17 | 20 | 20 | 30 |
| ZnO | 50 | 36 | 37 | 55 | 43 | 30 | 40 | 47 | 46 | 55 |
| $P_2O_5$ | 30 | 33 | 30 | 35 | 28 | 45 | 30 | 30 | 30 | 15 |
| $Li_2O$ | 0 | 0 | 0 | 0 | 1 | 0 | 0 | 0 | 0 | 0 |
| $Na_2O$ | 0 | 0 | 0 | 0 | 1 | 0 | 0 | 0 | 0 | 0 |
| $K_2O$ | 0 | 0 | 0 | 0 | 1 | 0 | 0 | 0 | 0 | 0 |
| $Al_2O_3$ | 0 | 0 | 0 | 0 | 2 | 0 | 10 | 0 | 1 | 0 |
| $B_2O_3$ | 0 | 0 | 0 | 0 | 1 | 0 | 3 | 3 | 2 | 0 |
| $SiO_2$ | 0 | 0 | 0 | 0 | 1 | 0 | 0 | 0 | 1 | 0 |
| MgO | 0 | 0 | 0 | 0 | 0.5 | 0 | 0 | 0 | 0 | 0 |
| CaO | 0 | 0 | 0 | 0 | 0.5 | 0 | 0 | 0 | 0 | 0 |
| SrO | 0 | 0 | 0 | 0 | 0.5 | 0 | 0 | 0 | 0 | 0 |

TABLE 2-continued

|  | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|
| BaO | 0 | 0 | 0 | 0 | 0.5 | 0 | 0 | 0 | 0 | 0 |
| SnO/ZnC | 0.40 | 0.86 | 0.89 | 0.18 | 0.47 | 0.83 | 0.43 | 0.43 | 0.43 | 0.55 |
| Construction |  |  |  |  |  |  |  |  |  |  |
| Glass | 100 | 85 | 10 | 15 | 70 | 65 | 80 | 70 | 80 | 80 |
| Filler |  |  |  |  |  |  |  |  |  |  |
| Alumina | 0 | 5 | 0 | 0 | 20 | 0 | 0 | 10 | 20 | 0 |
| Mullite | 0 | 0 | 0 | 0 | 0 | 5 | 0 | 0 | 0 | 0 |
| Zircon | 0 | 0 | 0 | 0 | 10 | 0 | 20 | 20 | 10 | 20 |
| Cordierite | 0 | 5 | 0 | 0 | 0 | 20 | 0 | 0 | 0 | 0 |
| β-Spodumene | 0 | 0 | 0 | 0 | 0 | 0 | 0 | 0 | 0 | 0 |
| Silica | 0 | 0 | 0 | 0 | 0 | 10 | 0 | 0 | 0 | 0 |
| β-Quartz solid solution | 0 | 0 | 0 | 0 | 0 | 0 | 0 | 0 | 0 | 0 |
| β-Eucryptite | 0 | 0 | 0 | 0 | 0 | 0 | 0 | 0 | 0 | 0 |
| Conductive powder (Al) | 0 | 0 | 90 | 0 | 0 | 0 | 0 | 0 | 0 | 0 |
| Conductive powder (Ag) | 0 | 0 | 0 | 85 | 0 | 0 | 0 | 0 | 0 | 0 |
| Firing temperature | 560 | 600 | 600 | 850 | 520 | 580 | 560 | 560 | 560 | 560 |
| Sintering degree | Good | Good | Good | Good | Good | Good | Good | Good | Good | Poor |
| Expansion coefficient | 82 | 75 | 105 | 96 | 72 | 68 | 70 | 70 | 70 | — |
| $T_S$ | 471 | 431 | 429 | 472 | — | 433 | 480 | 511 | 532 | 448 |
| $α_G$ | 82 | 83 | 79 | 86 | — | 99 | — | 77 | — | 59 |

CE*: Comparative Example

With respect to each of the glass powders in Table 3, the glass transition point $T_g$, the crystallization peak temperature $T_c$, the degree of elution $Q_d$, the flow button diameter D and the flow button appearance were measured or evaluated. The methods will be described below, and the results are shown in Table 3. Examples 22 to 26 represent Examples suitable for firing at 560° C., Examples 27 and 28 are Examples suitable for firing at 580° C., and Example 29 is a Comparative Example.

$T_g$ (unit: ° C.) and $T_c$ (unit: ° C.): A glass powder having an average particle size of from 10 to 20 μm is used as a sample, and $T_g$ and $T_c$ are measured within a range of from room temperature to 800° C. at a temperature raising rate of 10° C./min by a differential thermal analysis. Here, an alumina powder is used as a standard substance. For firing at 560° C., the softening point $T_s$ is desired to be at most 560° C., and $T_c$ is desired to be at least 620° C. For firing at 580° C., $T_s$ is desired to be at most 580° C., and $T_c$ is desired to be at least 650° C.

$Q_d$ (%): The same sample as the sample for measuring the expansion coefficient is immersed in water of 80° C. for 24 hours, and the weight reduction is calculated from the weights of the sample before and after the immersion. $Q_d$ is an index for the chemical durability and is preferably at most 0.1%, more preferably at most 0.02%, particularly preferably less than 0.01%.

D (unit: mm): 3.5 g of a glass powder is press-molded into a cylindrical shape having a diameter of 12.7 mm, which is used as a sample. This sample is held at 560° C. for 10 minutes with respect to Examples 22 to 26 and 29, or at 580° C. for 10 minutes with respect to Examples 27 and 28, and the diameter of the sample after this heat treatment is represented by D. D is preferably at least 13 mm, more preferably at least 14 mm.

Flow button appearance: The appearance of the sample after the above heat treatment obtained by the measurement of D, is evaluated. This appearance is an index for the degree of crystallization, and the appearance should preferably have a gloss, when the glass is used to solve the above-described problem (2). One having a gloss is identified by ○, and one having no gloss is identified by X. The powder of the glass of Example 29 did not sufficiently sinter by the above-mentioned heat treatment.

TABLE 3

|  | Ex. 22 | Ex. 23 | Ex. 24 | Ex. 25 | Ex. 26 | Ex. 27 | Ex. 28 | Ex. 29 |
|---|---|---|---|---|---|---|---|---|
| SnO | 20 | 22 | 20 | 20 | 23 | 22 | 22 | 20 |
| ZnO | 31 | 31 | 33 | 33 | 29 | 28 | 25 | 25 |
| $P_2O_5$ | 33 | 33 | 33 | 33 | 30 | 33 | 35 | 30 |
| $B_2O_3$ | 3 | 3 | 3 | 1 | 3 | 4 | 3 | 0 |
| CaO | 10 | 8 | 0 | 10 | 11 | 10 | 12 | 20 |
| SrO | 0 | 0 | 8 | 0 | 0 | 0 | 0 | 0 |
| $Al_2O_3$ | 3 | 2 | 3 | 3 | 2 | 3 | 3 | 2 |
| $In_2O_3$ | 0 | 1 | 0 | 0 | 0 | 0 | 0 | 0 |
| $WO_3$ | 0 | 0 | 0 | 0 | 0 | 2 | 0 | 3 |
| SnO/ZnO | 0.65 | 0.71 | 0.61 | 0.61 | 0.79 | 0.79 | 0.88 | 0.80 |
| $T_g$ | 408 | 413 | 412 | 394 | 407 | 412 | 419 | 429 |
| $T_s$ | 540 | 549 | 548 | 531 | 536 | 569 | 579 | 500 |
| $T_c$ | 662 | 668 | 648 | 647 | 632 | 676 | 677 | 647 |
| $α_G$ | 80 | 75 | 75 | 78 | 74 | 76 | 75 | 79 |
| $Q_d$ | <0.01 | <0.01 | 0.02 | <0.01 | 0.02 | <0.01 | <0.01 | <0.01 |
| D | 16 | 18 | 18 | 18 | 15 | 17 | 17 | 12 |
| Appearance | ○ | ○ | ○ | ○ | ○ | ○ | ○ | X |

As described in the foregoing, according to the present invention, it is possible to obtain a low melting point glass and a glass ceramic composition, which contain no lead and which are suitable for sealing cathode ray tubes, PDP or VFD, for covering substrates, for forming partition walls for PDP or VFD, or for functional pastes such as conductive pastes. Further, it is also possible to obtain a fired body excellent in an electrical insulating property.

What is claimed is:

1. A low melting point glass consisting essentially of, as represented by mol % based on the following oxides:

|  | Mol % |
| --- | --- |
| SnO | 2 to 37.5, |
| ZnO | 5 to 73, |
| $P_2O_5$ | 16 to 37, |
| $Li_2O$ | 0 to 9, |
| $Na_2O$ | 0 to 9, |
| $K_2O$ | 0 to 9, |
| $Al_2O_3$ | 0 to 20, |
| $B_2O_3$ | 0 to 30, |
| $SiO_2$ | 0 to 20, |
| MgO | 0 to 35, |
| CaO | 0 to 35, |
| SrO | 0 to 35, |
| BaO | 0 to 35, |
| $In_2O_3$ | 0 to 10, |
| $WO_3$ | 0 to 10, | wherein $SnO+ZnO+P_2O_5+B_2O_3$ is at least 76 mol %, $Li_2O+Na_2O+K_2O$ is from 0 to 9 mol %, $MgO+CaO+SrO+BaO$ is from 0 to 35 mol %, and the molar ratio of SnO to ZnO is less than 1.

2. A low melting point glass consisting essentially of, as represented by mol % based on the following oxides:

|  | Mol % |
| --- | --- |
| SnO | 2 to 37.5, |
| ZnO | 32 to 73, |
| $P_2O_5$ | 25 to 37, |
| $Li_2O$ | 0 to 9, |
| $Na_2O$ | 0 to 9, |
| $K_2O$ | 0 to 9, |
| $Al_2O_3$ | 0 to 20, |
| $B_2O_3$ | 0 to 30, |
| $SiO_2$ | 0 to 20, |
| MgO | 0 to 30, |
| CaO | 0 to 30, |
| SrO | 0 to 30, |
| BaO | 0 to 30, | wherein $Li_2O+Na_2O+K_2O$ is from 0 to 9 mol %, $MgO+CaO+SrO+BaO$ is from 0 to 30 mol %, and the molar ratio of SnO to ZnO is less than 1.

3. A low melting point glass consisting essentially of, as represented by mol % based on the following oxides:

|  | Mol % |
| --- | --- |
| SnO | 2 to 35, |
| ZnO | 5 to 45, |
| $P_2O_5$ | 16 to 37, |
| $Li_2O$ | 0 to 3, |
| $Na_2O$ | 0 to 3, |
| $K_2O$ | 0 to 3, |
| $Al_2O_3$ | 0 to 10, |
| $B_2O_3$ | 0 to 30, |
| MgO | 0 to 35, |
| CaO | 0 to 35, |
| SrO | 0 to 35, |
| BaO | 0 to 35, |
| $In_2O_3$ | 0 to 10, |
| $WO_3$ | 0 to 10, | wherein $Li_2O+Na_2O+K_2O$ is from 0 to 3 mol %, $MgO+CaO+SrO+BaO$ is from 0 to 35 mol %, $Al_2O_3+In_2O_3+WO_3$ is from 0 to 3 mol % and the molar ratio of SnO to ZnO is less than 1.

4. A glass ceramic composition for sealing a panel and a funnel of a cathode ray tube, which comprises from 60 to less than 100 wt % of a powder of the low melting point glass as defined in claim 1 and from more than 0 to 40 wt % of a low expansion ceramic filler, whereby the average linear expansion coefficient in a range of from 50 to 300° C. of a sintered body obtainable by firing the glass ceramic composition is from $80\times10^{-7}$ to $110\times10^{-7}$/° C.

5. A glass ceramic composition for sealing a panel and a funnel of a cathode ray tube, which comprises from 60 to less than 100 wt % of a powder of the low melting point glass as defined in claim 2 and from more than 0 to 40 wt % of a low expansion ceramic filler, whereby the average linear expansion coefficient in a range of from 50 to 300° C. of a sintered body obtainable by firing the glass ceramic composition is from $80\times10^{-7}$ to $110\times10^{-7}$/° C.

6. A glass ceramic composition for sealing a panel and a funnel of a cathode ray tube, which comprises from 60 to less than 100 wt % of a powder of the low melting point glass as defined in claim 3 and from more than 0 to 40 wt % of a low expansion ceramic filler, whereby the average linear expansion coefficient in a range of from 50 to 300° C. of a sintered body obtainable by firing the glass ceramic composition is from $80\times10^{-7}$ to $110\times10^{-7}$/° C.

7. A glass ceramic composition for sealing a plasma display panel or a vacuum fluorescent display, which comprises from 50 to less than 100 wt % of a powder of the low melting point glass as defined in claim 1 and from more than 0 to 50 wt % of a low expansion ceramic filler, whereby the average linear expansion coefficient in a range of from 50 to 250° C. of a sintered body obtainable by firing the glass ceramic composition is from $60\times10^{-7}$ to $90\times10^{-7}$/° C.

8. A glass ceramic composition for sealing a plasma display panel or a vacuum fluorescent display, which comprises from 50 to less than 100 wt % of a powder of the low melting point glass as defined in claim 2 and from more than 0 to 50 wt % of a low expansion ceramic filler, whereby the average linear expansion coefficient in a range of from 50 to 250° C. of a sintered body obtainable by firing the glass ceramic composition is from $60\times10^{-7}$ to $90\times10^{-7}$/° C.

9. A glass ceramic composition for sealing a plasma display panel or a vacuum fluorescent display, which comprises from 50 to less than 100 wt % of a powder of the low melting point glass as defined in claim 3 and from more than 0 to 50 wt % of a low expansion ceramic filler, whereby the average linear expansion coefficient in a range of from 50 to 250° C. of a sintered body obtainable by firing the glass ceramic composition is from $60\times10^{-7}$ to $90\times10^{-7}$/° C.

10. The glass ceramic composition according to claim 4, wherein the low expansion ceramic filler is a powder of at least one member selected from the group consisting of alumina, mullite and zircon, and the total content thereof is from more than 0 to 9 wt %.

11. The glass ceramic composition according to claim 5, wherein the low expansion ceramic filler is a powder of at least one member selected from the group consisting of alumina, mullite and zircon, and the total content thereof is from more than 0 to 9 wt %.

12. The glass ceramic composition according to claim 6, wherein the low expansion ceramic filler is a powder of at least one member selected from the group consisting of alumina, mullite and zircon, and the total content thereof is from more than 0 to 9 wt %.

13. The glass ceramic composition according to claim 7, wherein the low expansion ceramic filler is a powder of at least one member selected from the group consisting of alumina, mullite and zircon, and the total content thereof is from more than 0 to 9 wt %.

14. The glass ceramic composition according to claim 8, wherein the low expansion ceramic filler is a powder of at least one member selected from the group consisting of alumina, mullite and zircon, and the total content thereof is from more than 0 to 9 wt %.

15. The glass ceramic composition according to claim 9, wherein the low expansion ceramic filler is a powder of at least one member selected from the group consisting of alumina, mullite and zircon, and the total content thereof is from more than 0 to 9 wt %.

16. A glass ceramic composition for covering a substrate, which comprises from 50 to less than 100 wt % of a powder of the low melting point glass as defined in claim 1 and from more than 0 to 50 wt % of a low expansion ceramic filler.

17. A glass ceramic composition for covering a substrate, which comprises from 50 to less than 100 wt % of a powder of the low melting point glass as defined in claim 2 and from more than 0 to 50 wt % of a low expansion ceramic filler.

18. A glass ceramic composition for covering a substrate, which comprises from 50 to less than 100 wt % of a powder of the low melting point glass as defined in claim 3 and from more than 0 to 50 wt % of a low expansion ceramic filler.

19. A glass ceramic composition for forming a partition wall of a plasma display panel or a vacuum fluorescent display, which comprises from 50 to less than 100 wt % of a powder of the low melting point glass as defined in claim 1 and from more than 0 to 50 wt % of a low expansion ceramic filler.

20. A glass ceramic composition for forming a partition wall of a plasma display panel or a vacuum fluorescent display, which comprises from 50 to less than 100 wt % of a powder of the low melting point glass as defined in claim 2 and from more than 0 to 50 wt % of a low expansion ceramic filler.

21. A glass ceramic composition for forming a partition wall of a plasma display panel or a vacuum fluorescent display, which comprises from 50 to less than 100 wt % of a powder of the low melting point glass as defined in claim 3 and from more than 0 to 50 wt % of a low expansion ceramic filler.

22. A conductive paste comprising an organic vehicle and an inorganic component containing a conductive powder, wherein the inorganic component comprises from 1 to 50 wt % of a powder of the low melting point glass as defined in claim 1, from 50 to 99 wt % of a conductive powder and from 0 to 10 wt % of a low expansion ceramic filler.

23. A conductive paste comprising an organic vehicle and an inorganic component containing a conductive powder, wherein the inorganic component comprises from 1 to 50 wt % of a powder of the low melting point glass as defined in claim 2, from 50 to 99 wt % of a conductive powder and from 0 to 10 wt % of a low expansion ceramic filler.

24. A conductive paste comprising an organic vehicle and an inorganic component containing a conductive powder, wherein the inorganic component comprises from 1 to 50 wt % of a powder of the low melting point glass as defined in claim 3, from 50 to 99 wt % of a conductive powder and from 0 to 10 wt % of a low expansion ceramic filler.

* * * * *